Figure 1:
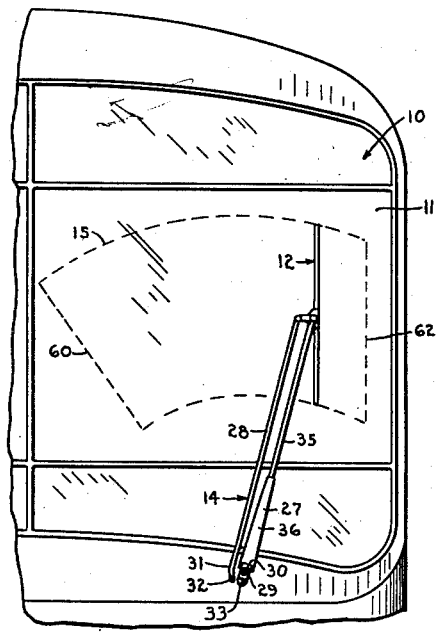

Feb. 12, 1963   R. B. MACPHERSON   3,076,991
WINDSHIELD WIPER ASSEMBLY
Filed Feb. 8, 1960

INVENTOR.
ROBERT B. MACPHERSON
BY
W. E. Recktenwald
ATTORNEY

United States Patent Office 3,076,991
Patented Feb. 12, 1963

3,076,991
WINDSHIELD WIPER ASSEMBLY
Robert B. Macpherson, Hobart, Ind., assignor to The
Anderson Company, a corporation of Indiana
Filed Feb. 8, 1960, Ser. No. 7,262
2 Claims. (Cl. 15—250.23)

This invention pertains to windshield wiper equipment, and more particularly is directed to wipers for use on vehicles having unusually large window surfaces to be cleaned.

As is well known, the windshields of buses, street cars, airplanes and some trucks are of much larger area than those of ordinary vehicles. Windshields of the picture-window type, for example, require a correspondingly longer actuating arm, and the blade itself is commonly of a length greatly exceeding that required for ordinary automobiles. The wipe pattern cleared by a conventional wiper is inadequate since it leaves vision through much of the window of vehicles of the kind mentioned obstructed by the elements and the like. On the other hand, the simplicity, economy, appearance and efficiency of the oscillatory wiper has established it as the basic mode of wiping the surface of a windshield. For vehicles of the kind mentioned, the area of the windshield cleaned by the wiper blade has been extended somewhat across the glass by employing a dual or pantograph-type wiper arm structure, the outer ends of which are connected by link means, which link means in turn carries the wiper blade. Manifestly, the link means just referred to must be relatively light in weight and construction. The stresses involved in the operation of such longer arms and blades, particularly when snow is encountered, imposes considerable stress on the means for transmitting the driving force to the blade, especially upon the afore-mentioned link means, causing the pivot pins of the link means to loosen and allowing the blade to roll over on its side or tilt relative to the surface of the glass. Under the last-mentioned circumstance, the blade does not function properly and the metal parts of the blade sometimes contact and scratch the glass.

With the foregoing in mind, it is the primary object of this invention to provide a wiper arm structure including link means which will substantially eliminate objectionable tilting of the wiper blade.

It is a further object of this invention to provide an arm-and-blade actuating structure including a wiper-supporting link means that is of marked ruggedness, is relatively light in weight, and will substantially prevent tilting of the wiper blade.

Another object of this invention is to provide an arm-and-blade apparatus capable of pushing snow from the path of the blade with a minimum danger of scratching the glass through contact therewith of metal portions of the apparatus employed in the wiping operation.

It is another object of this invention to provide wiper apparatus wherein the blade is transversed by an arm structure which has a special connection between the arm structure and the blade for maintaining the blade vertical while preventing tilting of the blade relative to the surface of the glass, said connection being designed for service in connection with either flat or curved glasses.

A more specific object of this invention is to provide an improved means for maintaining the wiper blade in a substantially vertical position throughout the critical portion of its stroke, while stabilizing the wiper blade against tilting relative to the surface of the glass throughout the wiper stroke.

Other objects and advantages of the invention will become apparent after the description hereinafter set forth is considered in conjunction with the accompanying drawings.

Figure 3:
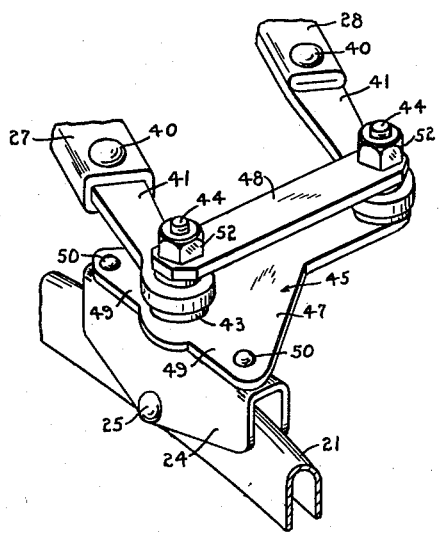
Figure 2:
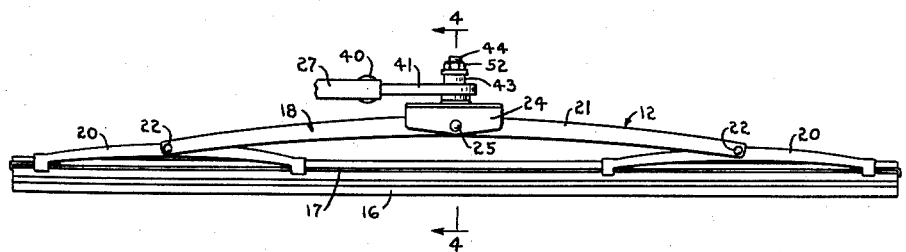
Figure 4:
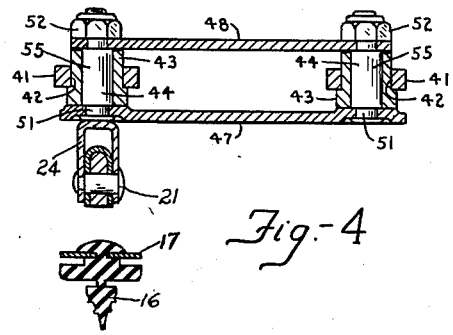

In the drawings:
FIGURE 1 is an elevational view of the invention as applied to a windshield;
FIGURE 2 is a side view of the wiper blade incorporating my invention, the operating arm structure being broken away;
FIGURE 3 is an enlarged perspective view of the connection of the blade to the wiper arm structure; and
FIGURE 4 is a cross section taken along line 4—4 of FIGURE 3.

Referring to the drawings, wherein similar reference numerals refer to similar parts throughout the several views, a front portion 10 of a bus is shown having a windshield 11 and a wiper blade 12 mounted on a pantograph or dual arm structure 14 for traversing the blade across the windshield surface in a pattern outlined by the dotted lines 15. The arm structure 14 is connected to spaced shafts, one of which is actuated by a motor means (not shown) located within the vehicle housing.

More particularly, the wiper blade unit 12 is illustrated as the flexible type adapted for operation on either a flat or curved surface, the blade shown corresponding generally to the blade disclosed in the U.S. Patent No. 2,596,-093 to J. W. Anderson. Specifically, the blade 12 has a resilient wiping strip 16 of rubber or equivalent material, a flexible backing strip or flexor 17 receiving said wiping strip therein, and a pressure-distributing superstructure 18 operatively connected to the backing strip. The superstructure 18 includes a pair of secondary yokes 20, one being disposed on each end portion of the backing strip and operatively connected to the latter, and a primary yoke or bridge member 21 having its ends pivoted at 22 to an intermediate portion of each of the secondary yokes, whereby the blade unit may be flexed to conform with the particular surface being wiped. A connector or clip 24 of inverted U-shape in cross section straddles the intermediate portion of the bridge member 21. A pivot pin 25 passes through the side walls of the connector 24 and through the center portion of the bridge member 21 to permit the blade unit to rock about the axis of the pin 25 as it becomes necessary to establish uniform contact of the blade with the surface being wiped.

The arm structure 14 for traversing the blade unit 12 across the windshield surface consists of two substantially straight arms, a main arm 27 and an idler or movement-modifying arm 28. The main arm 27 is rigidly connected at one end portion to an oscillatory drive shaft 29 by any well-known means, such as by a nut 30 threaded on the shaft. The movement-modifying arm 28 has one end portion 31 angularly disposed with respect to the rest of the arm with the end of said portion 31 pivoted to a rock shaft 32 horizontally positioned a predetermined distance from the drive shaft 29 for the main arm 27.

Main arm 27 comprises a mounting section 33 for connection to the pivot shaft 29 by the nut 30, and an outer blade-carrying section 35 pivotally connected to the mounting section so as to swing toward and from the windshield 11. The blade-carrying section 35 of the arm 27 has a channeled portion 36 pivotally connected to the mounting section for housing a spring member for urging the outer end of the main arm 27 toward the windshield. It should be understood that the conventional spring arrangement within said channeled portion acts between the mounting section 33 and the blade-carrying section 35 to bias arm 27 and the wiper blade 12 toward the surface being wiped.

Secured to the outer end of each arm 27, 28 as by rivets 40 is a flat shank member 41, the outer end of each shank member having a cylindrical opening 42 formed therein for substantially rigid connection to a bearing sleeve 43 which is freely rotatable on the pins 44 constituting part of a link means or connection 45 between the arms and the blade unit 12.

The link means 45 comprises a base strut 47 and an auxiliary opposed strut 48 vertically spaced therefrom, both struts being relatively short as compared with the lengths of the arms 27, 28. The base strut 47 of the link means has flared wing portions 49 through the extreme ends of which are passed the rivets 50 for securing the strut 47 and link means 45 rigidly to the back of the connector or clip 24 on the blade 12. Base strut 47 has securely fixed thereon and projecting normal to the surface thereof the spaced pivot pins 44 referred to above. Pins 44 may be secured to the base strut in any conventional way. As illustrated, each pin has a reduced shank 51 passing through an aperture in the base strut, with the protruding end of the shank being swaged against the outer face of said link so that the rivet connection between the strut 47 and clip 24 is independent of the adjacent pivot pin. The other end portion of each pin is threaded and has a reduced diameter so as to produce an enlarged center portion 55 on each pin 44. The auxiliary strut 48 is formed with openings near each extremity through which said threaded reduced end portions of the pins 44 pass, whereby application of a nut 52 to the projecting portion of the pin secures the struts 48 against the abutments created by the enlarged center portions 55 of the pin so that the link connection 45 is produced.

The cylindrical bearing sleeves 43 have a force fit or other connection with the walls of the openings 42 of the arms 27, 28, which sleeves are arranged between the base and auxiliary struts 47, 48 and rotatably surround the pins 44. Nuts 52 draw the two struts solidly against the ends of the enlarged center portions 55 of the pins 44 so as to provide a rigid and close coupled rectangular link structure. Each bearing sleeve 43 is formed near one end thereof with a circumferential thrust shoulder 57 facing away from the blade 12 and against which the lower face of the shank 41 on the arms 27, 28 bears. The sleeves 43 are slightly shorter than the enlarged portions 55 of the pins 44 so that the sleeves rotate with the arms 27, 28 between the struts 47, 48 and about the portion 55 of the pins 44. Under the influence of the bias of arms 27, 28, shanks 41 on the arms are supported by the shoulders 57 on the sleeves 53 and urge the link means 45 and blade 12 toward the surface being wiped. The shanks 41 on the arms 27, 28 normally are positioned substantially midway between struts 47, 48 and the wiper-traversing thrust thereof will be applied along the longitudinal center line of the link means 45.

As is known, by varying the geometry of the arm structure 14, the link means 45 and/or the position of the pivot shafts 29, 32, the motion pattern of blade 12 may be varied to meet certain needs or exigencies. As shown in FIGURE 1 looking toward the windshield from the front of the vehicle, the pivot shafts 29 and 32 for the arms are located somewhat to the left of the driver's seat. Due to the pantograph-type arm structure, with the arm 14 in the left-hand position 60 of the wipe pattern 15, the blade unit 12 is substantially aligned with the wiper arm. As the arm 14 sweeps toward the right in FIGURE 1, the pantograph structure gradually pivots the blade 12 about an axis through the middle of the blade substantially perpendicular to the plane of the arm 14 so that in the solid-line position of FIGURE 1 the blade forms an angle A with the arm. The angle A between the arm and blade gradually increases until the extreme right position 62 is reached in the wipe pattern 15.

The link means 45 due to the parallelogram structure created by the struts 47, 48 and pins 44, 44 minimizes the ability of the wiper blade 12 to tilt or roll over about an axis lying substantially parallel to the longitudinal axis of the blade.

Prior pantograph constructions have employed only one strut or strap between the arm ends having pins, corresponding to the pins 44 hereof, riveted thereto. These prior devices, due to the heavy loads necessary to move the heavy arm and blade over a large area, caused repeated rocking stresses on the pins which tended to loosen their connection to the link piece, thereupon permitting the wiper blade to tilt relative to the vertical plane with the result that the windshield could be scratched and the wiping efficiency of the system reduced. In the present structure the afore-mentioned difficulty is overcome. In the first place, the thrust for moving the arms 27, 28 across the surface of the windshield is applied to link means 45 along the longitudinal center line thereof, evenly dividing the stress on struts 47, 48 and thereby reducing the tendency of pins 44 to rock on their swaged ends. Before tilting of the present blade can take place, the rigid rectangular parallelogram created by the struts 47, 48 and pins 44, 44 must cant or collapse. The rectilinear make-up, sturdy bracing of struts 47, 48 on pins 44, 44 and the even distribution of the stress applied thereto prevents distortion or canting of the link structure itself under situations likely to occur, thereby holding the vertical axis of the blade and pin 44 aligned with each other and perpendicular to the plane of the arms 27, 28.

Having thus described my invention, it is obvious that various modifications may be made in the same without departing from the spirit of the invention; and, therefore, I do not wish to be understood as limiting myself to the exact form, construction, arrangement and combination of parts herein shown and described.

I claim:

1. A windshield wiper arm assembly comprising a dual arm structure having a main operating arm and an idler arm, link means pivotally interconnecting the outer ends of said arms and comprising opposed relatively short and close coupled strut members straddling the outer ends of said arms, pivot pins fixed between the end portions of said strut members for connecting the said strut members together, the outer end of each of said arms having a bearing opening receiving one of said pivot pins, and a clip member for attaching a wiper blade to said arm structure rigidly attached to one of said strut members independently of the adjacent pivot pin.

2. A windshield wiper is claimed in claim 1, wherein the strut member connected to the clip member is provided with wing portions on opposite sides of the adjacent pivot pin with means associated with the wing portions rigidly connecting the said strut member to said clip member.

References Cited in the file of this patent

UNITED STATES PATENTS

| | | |
|---|---|---|
| 1,468,656 | Butler | Sept. 25, 1923 |
| 2,345,448 | Best | Mar. 28, 1944 |
| 2,560,780 | Sacchini | July 17, 1951 |
| 2,642,612 | Smulski | June 23, 1953 |
| 2,929,288 | Harvey et al. | Mar. 22, 1960 |